US009102999B2

(12) United States Patent
Hartley et al.

(10) Patent No.: US 9,102,999 B2
(45) Date of Patent: Aug. 11, 2015

(54) METHODS OF RECOVERING SCANDIUM FROM TITANIUM RESIDUE STREAMS

(71) Applicant: Bloom Energy Corporation, Sunnyvale, CA (US)

(72) Inventors: Christopher Jeffrey Hartley, San Francisco, CA (US); Wayne Werneke Hazen, Lakewood, CO (US); David Ross Baughman, Golden, CO (US); Christel Maria Angelina Bemelmans, Indian Hills, CO (US); Pavel Federovich Belits, Boulder, CO (US); Timothy James Lanyk, Golden, CO (US); Brook Forest Porter, Menlo Park, CA (US); Lunzhi Liao, Sunnyvale, CA (US); Justin McAllister, Sunnyvale, CA (US); Michael Shang-Yu Yang, Foster City, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 0 days.

(21) Appl. No.: 14/151,177

(22) Filed: Jan. 9, 2014

(65) Prior Publication Data
US 2014/0193317 A1 Jul. 10, 2014

Related U.S. Application Data

(60) Provisional application No. 61/750,867, filed on Jan. 10, 2013.

(51) Int. Cl.
*C22B 59/00* (2006.01)
*C22B 3/20* (2006.01)
*C22B 3/26* (2006.01)

(52) U.S. Cl.
CPC ............. *C22B 59/00* (2013.01); *C22B 3/0005* (2013.01); *C22B 3/0098* (2013.01)

(58) Field of Classification Search
None
See application file for complete search history.

(56) References Cited

U.S. PATENT DOCUMENTS

| 4,751,061 A | 6/1988 | Kim et al. |
| 4,898,719 A | 2/1990 | Rourke et al. |
| 4,965,053 A | 10/1990 | Herchenroeder |
| 4,988,487 A * | 1/1991 | Lai et al. ............... 423/21.5 |
| 5,019,362 A * | 5/1991 | Rourke et al. ............... 423/21.5 |

(Continued)

FOREIGN PATENT DOCUMENTS

WO   WO2014/066727 A1   5/2014

OTHER PUBLICATIONS

International Search Report received in connection with international application No. PCT/US2014/010803; mailed Jun. 11, 2014.

(Continued)

*Primary Examiner* — Steven Bos
(74) *Attorney, Agent, or Firm* — The Marbury Law Group PLLC

(57) ABSTRACT

A method for selectively removing scandium from a scandium-containing feed solution includes contacting the scandium-containing feed solution with a solvent stream in plural stages using cross current extraction, in which the solvent is loaded with at least a portion of the scandium from the feed solution, and/or ion exchange, and separating the loaded solvent from remaining scandium-containing feed solution.

25 Claims, 5 Drawing Sheets

(56) References Cited

U.S. PATENT DOCUMENTS

| | | | |
|---|---|---|---|
| 5,049,363 A | | 9/1991 | Fueling |
| 5,378,262 A | * | 1/1995 | Mihaylov et al. ............... 75/722 |
| 5,492,680 A | | 2/1996 | Odekirk |
| 7,214,256 B2 | * | 5/2007 | Kordosky et al. ............... 75/721 |
| 7,704,398 B2 | * | 4/2010 | Pekkala et al. ................. 210/634 |
| 2003/0089201 A1 | * | 5/2003 | Harlamovs et al. ............. 75/722 |

OTHER PUBLICATIONS

Zhang et al., "A Solvent Extraction Process for the Preparation of Ultrahigh Purity Scandium Oxide," Hydrometallurgy 47 (1997) pp. 47-56.

Li et al., "Solvent Extraction of Scandium(III) by Cyanex 923 and Cyanex 925," Hydrometallurgy 48 (1998) pp. 301-312.

\* cited by examiner

METHODS OF RECOVERING SCANDIUM FROM TITANIUM RESIDUE STREAMS

RELATED APPLICATIONS

This patent application claims the benefit of priority to U.S. Provisional Patent Application Ser. No. 61/750,867, entitled "Methods of Recovering Scandium from Titanium Residue Streams" filed on Jan. 10, 2013, the entire contents of which are hereby incorporated by reference.

FIELD OF THE INVENTION

The present invention relates generally to selectively recovering scandium from extractive metallurgy waste, and more particularly to extracting and recovering scandium from waste acid streams generated from titanium processing.

BACKGROUND

Due to limitations in mining and availability, Scandium is currently only produced in small quantities. While the element occurs in many ores, it is only present in trace amounts; there are no known, easily-extractable deposits of minerals containing high scandium content. Currently, only a few mines, located in Russia, Ukraine and China, produce scandium, and in each case it is made as a byproduct from the extraction of other elements and sold as scandium oxide.

In particular, scandium has gained importance for the use of scandium-stabilized zirconia as a high efficiency electrolyte in solid oxide fuel cells. Applications of scandium also include use of scandium oxide ($Sc_2O_3$) to make high-intensity discharge lamps, and scandium-aluminum alloys that are used for minor aerospace industry components, baseball bats, and bicycle frames. As commercial uses for scandium continue to expand, there exists the need for the development of improved methods to selectively recover scandium from readily available sources.

SUMMARY OF THE INVENTION

An embodiment method of selectively removing scandium from a scandium-containing feed solution includes: transferring scandium ions from an aqueous phase to an organic phase, in which a loaded organic phase is created; scrubbing the loaded organic phase with an acidic solution; stripping scandium ions from the loaded organic phase into an aqueous phase, in which a loaded aqueous phase is created; and separating the scandium ions from the loaded aqueous phase by providing the loaded aqueous phase to an ion exchange apparatus.

Another embodiment method of selectively removing scandium from a scandium-containing feed solution includes: contacting the scandium-containing feed solution with a solvent stream in plural stages using cross-current extraction, in which the solvent is loaded with at least a portion of the scandium from the scandium-containing feed solution; and separating the loaded solvent from remaining scandium-containing feed solution.

An embodiment method of producing a scandium-containing product from a titanium- and scandium-containing acid solution stream includes producing at least 2.0 kg/h, preferably 2.0-2.9 kg/h, such as 2.8 kg/h, of the product comprising at least 99 wt % $Sc_2O_3$ per 125,000 L/h of the acid solution stream.

Another embodiment method of selectively removing scandium from a scandium-containing feed solution includes contacting the scandium-containing feed solution with at least one ion exchange resin, in which the at least one ion exchange resin is loaded with at least a portion of the scandium from the scandium-containing feed solution; providing an eluent solution to the at least one ion exchange resin, in which scandium is unloaded into an eluate stream; and converting the unloaded scandium in the eluate stream to a solid scandium oxide product.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
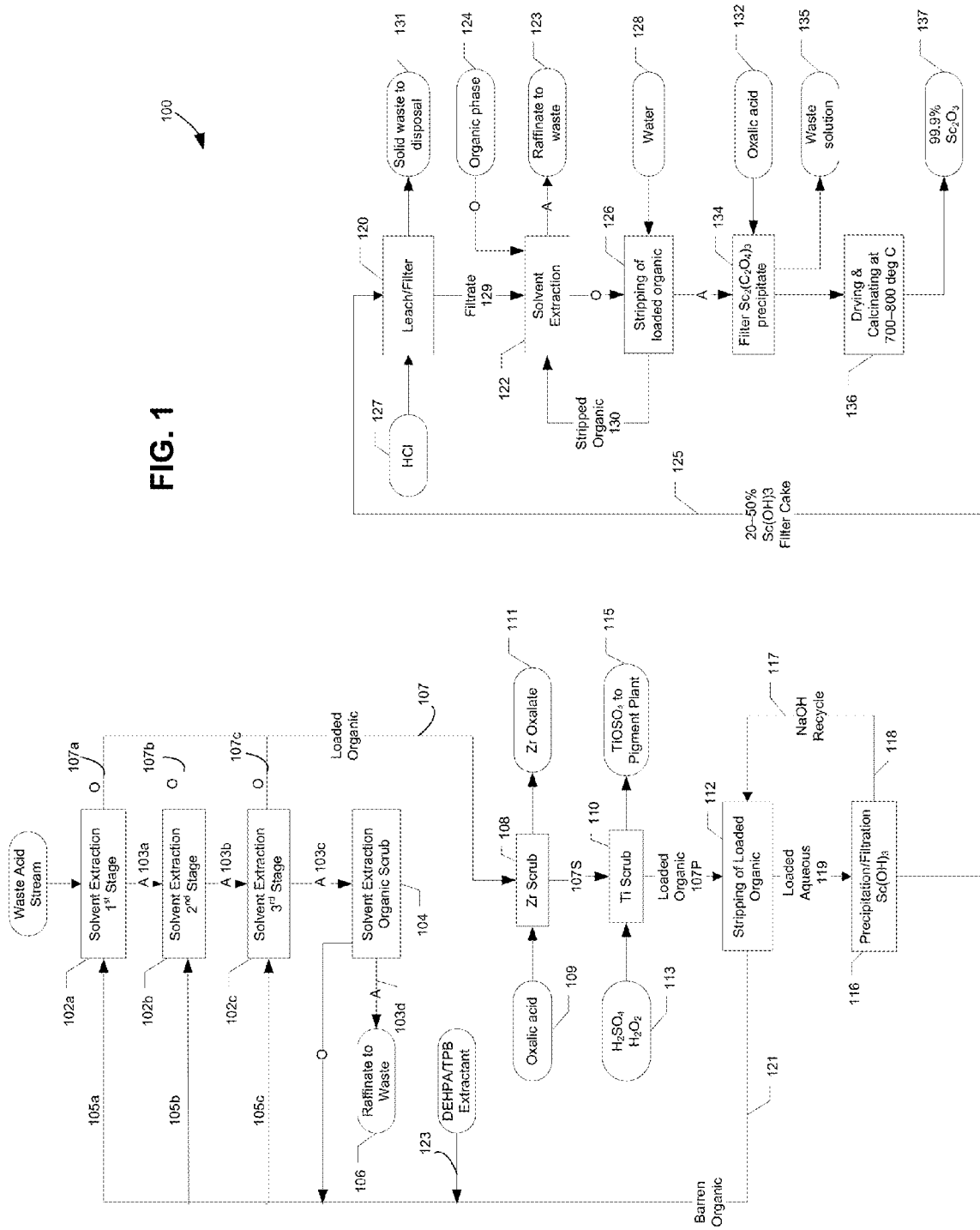
FIG. 1 is a process flow diagram illustrating an overview of the steps in a method of recovering scandium oxide from a titanium processing waste acid stream according to an embodiment.

As used herein, selective removal of an ion or compound generally refers to methods to facilitate the removal of the ion or compound from solutions. As used herein, the selective removal of scandium generally refers to methods to facilitate the removal of scandium (III) ions ($Sc^{3+}$) or scandium-containing compounds from a solution.

As used herein, solvent extraction refers to extracting a substance from one liquid phase (e.g., an aqueous solution) into a different liquid phase (e.g., an organic solvent) based on the relative solubility of the substance in each of the phases.

As used herein, titanium processing refers to extraction or refinement of titanium products, such as titanium dioxide ($TiO_2$) (e.g., by the sulfate process or chloride process), titanium sponge, and/or other titanium products for commercial use from titanium-containing ore. For example, titanium dioxide is commonly extracted from ilmenite using the sulfate method, which produces a waste stream containing dilute sulfuric acid. Another example is the extraction of titanium dioxide from rutile or leucoxene using the chloride method, which produces a waste stream containing hydrochloric acid. In an embodiment, the waste stream (e.g., liquor) from titanium dioxide processing may be hydrolytic solution (i.e., dissolved ions in solution) that contains approximately 15-20 mg/L scandium, with other impurities such as zirconium (Zr), titanium (Ti), iron (Fe) and silicon dioxide ($SiO_2$). In a preferred embodiment, scandium may be directly extracted from the effluent waste liquor from titanium dioxide processing. The embodiments described herein are equally applicable to artificially prepared waste streams that simulate the waste liquor from titanium processing, and to other salt solutions.

Scandium oxide, and more particularly scandium (III) oxide, is described herein as the end product of the various embodiment methods. However, scandium(III) oxide is given merely as an example, and the methods described herein may be used in the production of other useful products, including, but not limited to, non-stoichiometric scandium oxide, scandium(III) chloride ($ScCl_3$), scandium(III) hydroxide ($Sc(OH)_3$), and scandium(III) oxalate ($Sc_2(C_2O_4)_3$). These products are collectively referred to herein as "scandium compound end products".)

Methods for the selective recovery of scandium, e.g., scandium compound end products, for example, in the form of scandium oxide from titanium processing waste streams are provided. The steps of the various embodiments may include: solvent extraction (e.g., cross-current solvent extraction) to load at least one stage (e.g., multiple stages) of an organic phase with scandium ions (e.g., $Sc^{3+}$) from a solution; stripping scandium ions from the organic phase; precipitation and filtration of scandium hydroxide (e.g., $Sc(OH)_3$); leaching scandium ions from the filter cake; precipitation of a scandium oxalate product from the filtrate; and calcination and drying a product containing scandium oxide (e.g., $Sc_2O_3$). According to the preferred embodiments, byproducts may be recycled back for use in different steps of the process, or may be converted back into a starting reactant for use in a different step of the process.

A method for the selective recovery of scandium from a waste acid stream according to an embodiment is illustrated in FIG. 1. In method 100, scandium may be removed in a multi-stage cross-current solvent extraction process from a waste liquor generated during titanium dioxide (e.g., $TiO_2$) refinement by the sulfate method.

In the various embodiments, cross-current solvent extraction is performed by feeding a scandium-containing stream and a solvent stream into an extraction unit. In preferred embodiments, the scandium-containing stream may be an aqueous phase, i.e., a waste acid liquor stream containing scandium ions, and the solvent stream may be an organic phase.

In a preferred embodiment, cross-current solvent extraction may be performed as a multistage process using a cross-current array. A multistage cross-current array may contain multiple extraction units, for example two to six, such as three extraction units in series. In an embodiment, the extraction units in an array may be mixing tanks or settlers, or mixer-settler units. In another embodiment, extraction units may be centrifugal extractors that mix and separate in the same unit. In another embodiment, the extraction units may be separatory funnels.

In steps 102a-102c, a waste acid stream 101 containing many species in solution, including scandium, may be contacted and mixed with an extractant and an organic liquid at a phase ratio of 1:2 to 1:10, such as 1:5, organic to aqueous (O:A). The organic liquid may be, for example, a high flash point kerosene (e.g., laboratory grade kerosene) or another organic with similar properties (e.g., hexane). In a preferred embodiment, an extractant is also mixed with the waste acid stream and the organic phase. The extractant may be one of a number of commercially available reagents. Examples of such extractants may include, but are not limited to, bis(2 ethylhexyl)hydrogen phosphate (DEHPA) (CAS Number 4971-47-5), and tributyl phosphate (TBP) (CAS Number 126-73-8).

The extractant reacts with a portion of the scandium ions in the aqueous phase to form a Sc-extractant complex that is more soluble in the organic liquid than in the aqueous phase. In a preferred multistage cross-current process, the aqueous raffinate 103a, 103b from one extraction unit in steps 102a-102c is fed to the next unit as the aqueous feed, while multiple cross-current streams of the barren (i.e., fresh or unloaded) organic phase 105a-105c are provided to extraction units to contact the aqueous feed, without feeding the loaded organic into the next extraction unit. Thus, barren organic phase is provided to each unit, while the aqueous phase flows from one unit to the next in series in the cross-current extraction process. Each successive extraction stage removes a portion of the remaining scandium ions in the aqueous phase into the organic phase 107a-107c. In a preferred embodiment, solvent extraction may include three cross-current stages, steps 102a-102c. However, other embodiments may include more than three stages, or may include fewer than three stages. In contrast, in a counter-current extraction process, the loaded organic phase is provided from one extraction unit to the next unit in series in an opposite direction to the aqueous phase flow between the units.

Thus, in an embodiment, the scandium-containing feed solution 101 is contacted with a barren first solvent stream 105a in a first stage 102a. The first solvent stream 105a is loaded with at least a portion of the scandium from the feed solution. The loaded first solvent 107a is separated from the remaining scandium-containing feed solution 103a from the first stage 102a.

The first stage is followed by contacting the remaining scandium-containing feed solution 103a from the first stage 102a with a barren second solvent stream 105b in a second stage 102b. The second solvent stream 105b is loaded with at least a portion of the scandium from the remaining scandium-containing feed 103a from the first stage 102a. The loaded second solvent 107b is separated from remaining scandium-containing feed solution 103b from the second stage 102b.

Then, in a third stage 102c, the remaining scandium-containing feed solution 103b from the second stage 102b is contacted with a barren third solvent stream 105c. The third solvent stream 105c is loaded with at least a portion of the scandium from the remaining scandium-containing feed 103b from the second stage 102b. The loaded third solvent 107c is separated from the remaining scandium-containing feed solution 103c from the third stage 102c.

This embodiment may include more than three stages described above. The first, second and third stages 102a-102c in this embodiment may be performed respectively in first, second, and third extraction units, connected in series to form a cross-current array.

At the end of steps 102a-102c, the spent aqueous solution 103c may be scrubbed using, for example, a dual media filter or a coalescer, to recover any organic phase that was carried through the extraction, step 104. The aqueous raffinate may be collected, for example, into a waste holding tank, step 106. Any recovered organic phase can be recycled so that it can be used in steps 105a-105c.

The cumulative loaded organic phase 107 from steps 102a-102c is then purified in a series of scrubbing steps. The scrubbing steps may also be conducted using a cross current process.

In an example embodiment, the loaded organic phase 107 may be provided to a zirconium scrubbing process, step 108. An example scrubbing agent for removal of Zr impurities may be, but is not limited to, oxalic acid ($H_2C_2O_4$) 109, for example, about 0.3-1.5 M, preferably about 1.1 M $H_2C_2O_4$, to remove Zr in the form of a zirconium(IV) oxalate compound ($Zr(C_2O_4)_3^{2-}$) 111. Zr scrubbing using oxalic acid may proceed according to the following reaction:

$$Zr(SO_4)_2 \cdot xHR + 3H_2C_2O_4 \rightarrow Zr(C_2O_4)_3^{2-} + 6H^+ + 2SO_4^{2-} + xHR$$ (eq. 1), where R represents the organic liquid. Alternative scrubbing agents that may be used include, for example, hydrofluoric acid (HF) or hydrochloric acid (HCl).

In step 110, the loaded organic 107S may be provided to a titanium scrubbing process. In an example embodiment, sulfuric acid (e.g., 0.5-5M $H_2SO_4$) and hydrogen peroxide (e.g., 2-10%, e.g., 5% $H_2O_2$) 113 may be used as scrubbing agents to remove titanium impurities 115. Titanium scrubbing using sulfuric acid and hydrogen peroxide may proceed according to the following reaction:

(eq. 2), where R represents the organic liquid. Other impurities that may be removed by further optional scrubbing stages (not shown for clarity in FIG. 1) may include, for example, iron (Fe) and manganese (Mn).

The spent scrubbing agents containing the impurities 111, 115 from steps 108 and 110 may also contain recoverable, usable compounds. For example, one of the compounds that may be present in the spent sulfuric acid and hydrogen peroxide used for titanium scrubbing in step 110 is titanium oxysulfate ($TiOSO_4$) 115. Titanium oxysulfate, which can be used as a mordant in dyeing processes, may be recovered from the spent scrubbing agent and used and/or sold for use in a pigment plant.

In step 112, a strip solution 117 may be added to the purified loaded organic phase 107P to unload scandium. The strip solution may be, for example, a sodium hydroxide (NaOH) solution. $Sc^{3+}$ ions may be unloaded from the organic phase 107P and into an aqueous phase 119 with Na and $OH^-$, from which $Sc(OH)_3$ may precipitate out of solution. Stripping scandium from the organic phase 107P using a NaOH strip solution may proceed according to the following reaction:

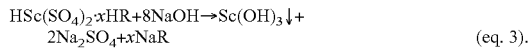
(eq. 3).

In an embodiment, the unloaded organic (i.e., barren organic 121) liquid may be recycled back to the extraction units, step 114, to be incorporated in the organic phase 105a-105c for the solvent extraction stages in steps 102a-102c. Extractant 123 can be added to barren organic 121 and recovered organic from step 104 to form the organic phase 105a-105c. $Sc(OH)_3$ may be separated from the aqueous solution 119 using any suitable techniques. In an example embodiment, $Sc(OH)_3$ precipitate 125 may be separated from the aqueous phase 119 in a clarifier. In another embodiment, a centrifuge may be used to separate the precipitated $Sc(OH)_3$ 125 from solution 119. In a preferred embodiment, the aqueous solution 119 containing $Sc(OH)_3$ precipitate may be fed into a filter (e.g., a vacuum filter) to produce a filter cake of $Sc(OH)_3$ 125, step 116. The filtrate solution may be recovered in a tank, and, in step 118, sodium hydroxide 117 may be recycled back to the strip solution used in step 112 to unload scandium ions from the organic phase 107P. In an embodiment, the resulting filter cake may contain, for example, 70-90 wt % $Sc(OH)_3$, thereby yielding 30-40 wt % scandium. The components which make up the other 10-30 wt % of the resulting filter cake may be, for example, residual $TiO_2$, NaOH, and/or rare earth elements.

In step 120, the filter cake 125 may be leached with an acid 127 to dissolve the Sc, producing an outflow filtrate solution 129 with scandium ions. In a preferred embodiment, the leaching acid 127 may be, but is not limited to, hydrochloric acid (HCl). Waste acid stream 131 contains $Ti(OH)_4$ to a pigment plant.

In step 122, the filtrate solution 129 may be contacted with an organic phase 124 in a solvent extraction process. The organic phase 124 may be an organic extractant, such as P350 (dimethylheptyl methyl phosphate), in an organic solvent, such as high flash point kerosene. The solvent extraction in step 122 may be carried out, for example, in a conventional solvent extraction plant using mixer-settlers in single or multi stage (up to 3 stages). As a result of step 122, the organic phase 124 may be loaded with scandium ions from the filtrate solution 129. The aqueous raffinate from the solvent extraction may be collected, for example, into a waste holding tank in step 123.

In step 126, the loaded organic phase from the solvent extraction in step 122 may be stripped with water 128, and the stripped organic 130 may be recycled to a mixer for reuse in the solvent extraction in step 122. In step 134, oxalic acid 132 may be added to a scandium-containing aqueous phase created from the stripping of the loaded organic phase in step 122, and a resulting scandium oxalate precipitate may be recovered by filtration. The waste acid solution 135 from the filtration step may be discarded or reused.

In step 136, the $Sc_2(C_2O_4)_3$ in the filtered scandium oxalate precipitate may be dried of excess moisture and calcinated (i.e., heated to convert $Sc_2(C_2O_4)_3$ to $Sc_2O_3$) at 700-800 degrees Celsius to obtain a scandium compound end product 137 (e.g., a scandium oxide solid composition) that has a composition of at least 99 wt %, such as around 99 to 99.9 wt % scandium oxide.

Thus, as described above, cross-current extraction and/or scrubbing result in a higher scandium recovery percent than counter-current extraction and/or scrubbing because cross-current extraction and/or scrubbing requires fewer repetitions or steps than comparable counter-current process. Since each extraction and/or scrubbing stage cycle inevitably loses a small amount of scandium, using a lower cycle number cross-current extraction and/or scrubbing results in a lower scandium loss and lower process cost than comparable counter-current methods.

Figure 2:
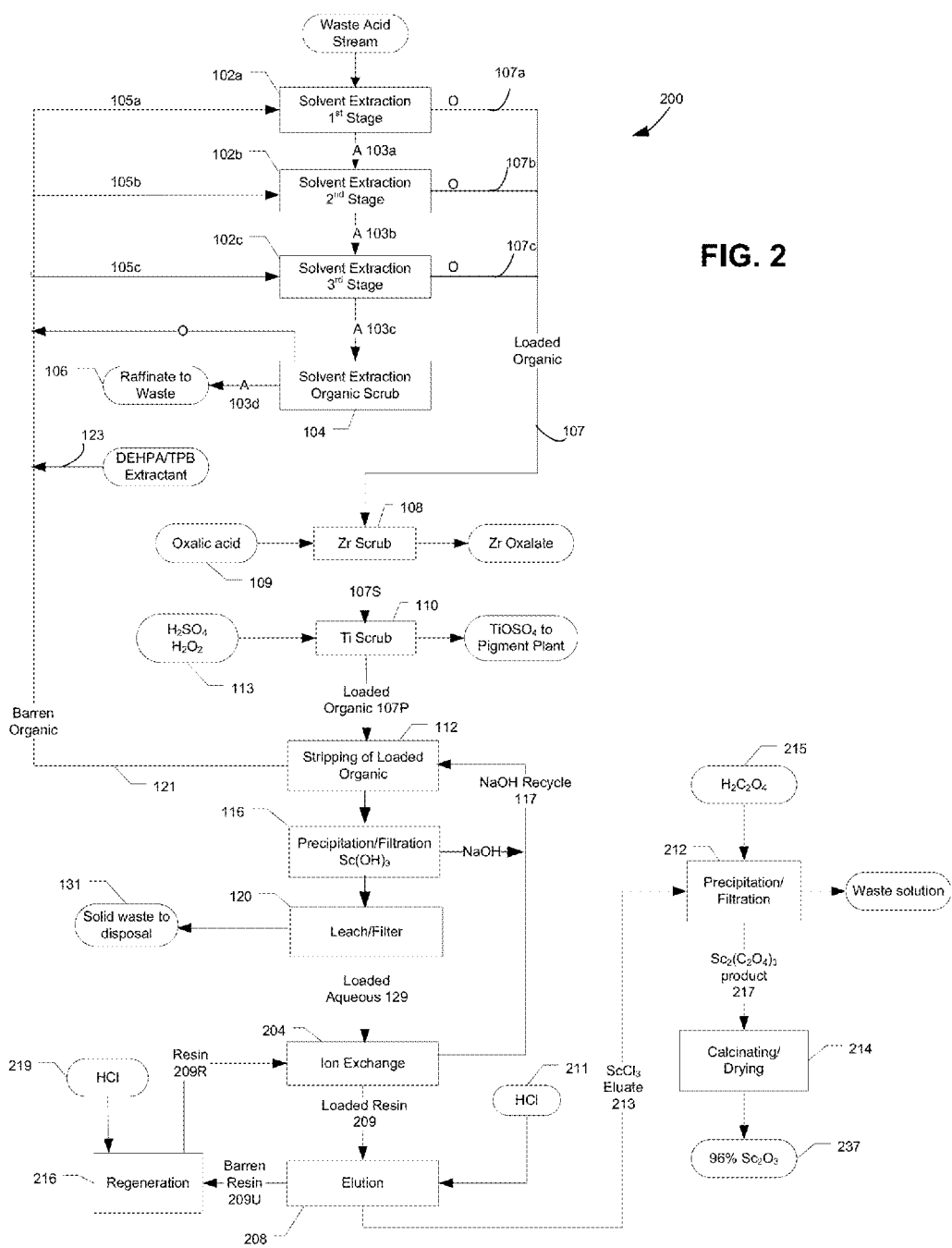
FIG. 2 is a process flow diagram illustrating an overview of the steps in a method of recovering scandium oxide from a titanium processing waste acid stream according to another embodiment.

FIG. 2 illustrates an alternative embodiment method to recover $Sc_2O_3$ from a titanium processing waste stream, which uses cross-current solvent extraction and an ion exchange apparatus.

In method 200, steps 102-121 are performed as discussed above with respect to FIG. 1. Then, in step 204, scandium containing loaded aqueous solution 129 may be loaded into a stationary phase adsorbent by providing the aqueous phase to a cationic exchange resin, such as in one or more chromatography columns. An example of an ion exchange resin that may be used is Lewatit TP 207, supplied by Bayer AG, which is a weakly acidic, macroporous-type ion exchange resin with chelating iminodiacetate groups that selectively removes heavy metal cations.

In step 208, scandium ions may be eluted from the loaded ion exchange resin 209. In a preferred embodiment, a hydrochloric acid eluent 211 may be provided to the one or more loaded columns to unload the scandium from the resin 209. Scandium ions may be displaced on the resin 209 by $H^+$ ions, and the resulting eluate 213 contains scandium chloride ($ScCl_3$) in solution. Thus, steps 204 and 208 replace steps 122 and 126 in the method of FIG. 1. In step 210, the $ScCl_3$ eluate 213 may be provided to a mixer with a solution of oxalic acid ($H_2C_2O_4$) 215 to cause scandium oxalate ($Sc_2(C_2O_4)_3$) to precipitate out of solution. In step 212, the resulting solution containing scandium oxalate (($Sc_2(C_2O_4)_3$) precipitates may be fed into a filter (e.g., a vacuum filter) to obtain a scandium oxalate ($Sc_2(C_2O_4)_3$) product 217. In step 214, the scandium oxalate ($Sc_2(C_2O_4)_3$) product 217 may be calcinated (i.e., heated to convert the oxalate to oxide) and excess moisture removed by drying to obtain a scandium compound end product 237 having a composition of at least 90 wt % $Sc_2O_3$, such as 93-95 wt % $Sc_2O_3$, e.g., around 96 wt % $Sc_2O_3$. In step 216, the unloaded (i.e., barren) ion exchange resin 209U may be regenerated for use in repeated cycles. For example, regeneration may be done by providing the column containing the ion exchange resin 209U with a solution of hydrochloric acid (HCl) 219 to create the regenerated resin 209R which is then loaded with additional loaded aqueous solution 129.

Figure 3:
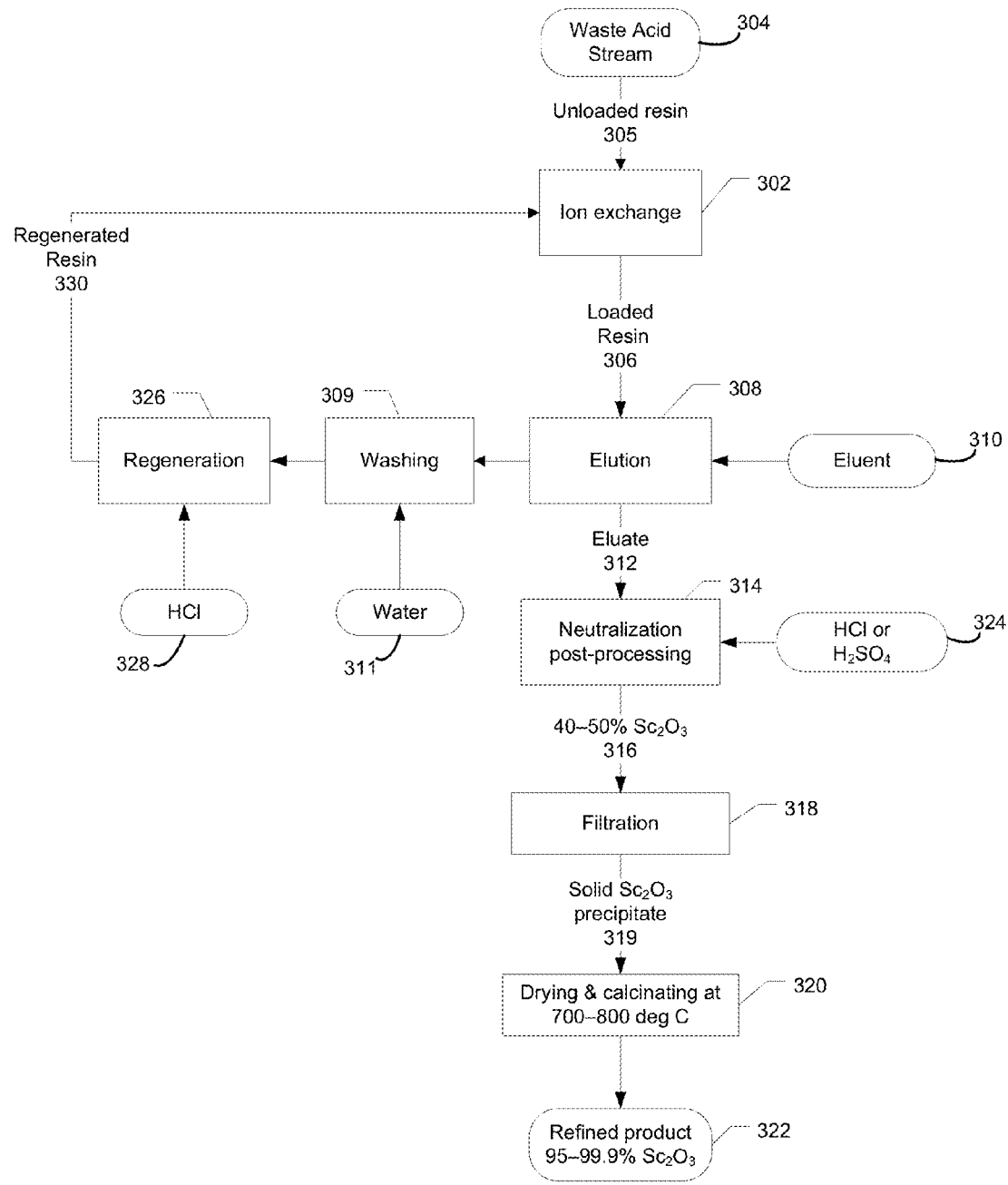
FIG. 3 is a process flow diagram illustrating an overview of the steps in a method of recovering scandium oxide from a titanium processing waste acid stream according to another embodiment.

FIG. 3 illustrates an alternative embodiment method to recover $Sc_2O_3$ from a titanium processing waste stream, which uses a series of ion exchange columns.

In step 302, a waste acid stream 304 (e.g., liquor) from titanium dioxide processing may be loaded into a stationary phase adsorbent by providing the stream to one or more cationic exchange resins 305. The waste acid stream 304 may be a direct waste acid stream, or may be an output scandium containing aqueous solution 119 in FIG. 1 or 119A in FIG. 2. In an embodiment, the waste acid stream 304 may be provided to multiple ion exchange columns that are in series, such as two or more, for example two to five, such as three ion exchange columns. As discussed above, the waste acid stream produced from titanium processing may be an aqueous stream containing hydrochloric acid. In various embodiments, the waste acid stream may contain approximately 15-40 mg/L scandium, as well as a high concentration of other metal ions, for example, iron (Fe), zirconium (Zr), vanadium (V), aluminum (Al), magnesium (Mg), manganese (Mn), and/or titanium (Ti).

Examples of ion exchange resins that may be used to make the ion exchange columns include ion exchange resins that contain sulfur-based and/or phosphorus-based ligands and/or chelating functional groups in ion exchange resins that are selective for scandium. In particular, commercially available ion exchange resins that may be used in the various embodiments include, but are not limited to, Lewatit® TP 207 or TP 260, Diphonix®, MonoPhos™, Water Treatment Polymer D402 macroporous aminophosphonic resin, and/or other commercially available ion exchange resins. Loading the ion exchange resins with scandium ions from the waste acid stream in various embodiments may proceed according to the following equation:

$$3R'H+Sc^+ \rightarrow R'_3Sc+3H^+ \quad \text{(eq. 4),}$$

where R' represents a cationic exchange resin, producing loaded resins 306. The use of plural (e.g., three) ion exchange columns in series may enable loading of at least 80% (e.g., 81-85%, such as 85%) of the scandium ions in the waste acid stream 304. Preferably, an ion exchange resin in the various embodiments has a high selectivity for scandium ions over iron (III) ions.

In step 308, an eluent 310 may be provided to the one or more loaded resins 306 to unload the scandium ions. In the various embodiments, the eluent 310 may be a solution having a logarithmic measure of the acid dissociation constant ($pK_a$) that is greater than or equal to −2, such as $pK_a$ of −2 to 12. In other words, the eluent is a weak acid, a neutral solution, or a base. Example eluents 310 that may be used include ethylenediaminetetraacetic acid ("EDTA"), sodium carbonate ($Na_2CO_3$), 1-hydroxyethylidene 1,1-diphosphonic acid ("Phos 6"), and/or other eluents which provide displacement ions, such as $H^+$, $Na^+$, etc. on the loaded resins 306. Scandium ions may be displaced on the resin 306 by $H^+$ or $Na^{2+}$, ions, with the resulting eluate 312 solution containing scandium salts in solution. In an embodiment in which the eluent 310 is EDTA, the elution of scandium ions may proceed according to the following reaction:

$$R'_3Sc+H_4EDTA \rightarrow 4H^+ + 3R' + [Sc(EDTA)]^- \quad \text{(eq. 5),}$$

where R' represents a cationic exchange resin. In various embodiments, the concentration of scandium in the eluate may be at least 800 mg/L, such as 800-1,000 mg/L. Thus, the scandium concentration in the eluate (i.e., the elution product) 312 may be greater than 25 times, such as 30-67 times that of the initial waste acid stream (i.e., 15-40 mg/L scandium). In the various embodiments, the eluate 312 may be a solution of a scandium-containing complex, for example, a scandium carbonate, a scandium hydroxide, and/or other scandium-containing complex depending on the eluent used.

In various embodiments, the loaded resin may also be washed with appropriate agents to remove various impurities co-extracted onto the resins (not shown).

In step 314, the scandium-containing eluate 312 may be subjected to post-processing steps to convert the eluted scandium to a solid scandium compound end product 316 containing greater than 40 wt %, such as 40-50 wt %, $Sc_2O_3$. In the various embodiments, the post-processing of step 314 may involve neutralizing the scandium-containing complex in the eluate 312 using mineral acids, such as hydrochloric acid or sulphuric acid 324. In step 318, solid scandium oxide precipitate 319 may be recovered from the neutralized slurry by filtration. In step 320, the precipitated solid scandium oxide compound may be dried of excess moisture and calcinated at 700-800 degrees Celsius to obtain a solid refined product 322 containing at least 95 wt % $Sc_2O_3$, such as 95-99.9 wt % $Sc_2O_3$.

In various embodiments, the ion exchange resins may be regenerated for use in repeated cycles, which may involve any of a variety of solutions depending on the composition of the resin. For example, in step 309, the unloaded (i.e., barren) ion exchange resin may be washed by providing water 311 to the column containing the ion exchange resin to displace the eluent, and to wash the unloaded (i.e., barren) ion exchange resin. In step 326, a solution of hydrochloric acid (HCl) 328 may be provided to the column containing the washed resin in order to create a regenerated resin 330, which may be provided back for loading with waste acid stream 304 to use in the ion exchange of step 302.

In various embodiments, a complexing agent may be added to the eluent to enhance separation factors preferentially for scandium may be added. For example, citric acid-ammonium citrate (($NH_4)_2C_6H_6O_7$) are described in the prior art as enhancing separation of rare earth metals. Additional complexing agents may include, but are not limited to, Ethylenediaminetetraacetic acid (EDTA), (2-Hydroxyethyl) ethylenediaminetriacetic acid (HEDTA), Diethylene triamine pentacetic acid (DTPA) and 1,2-Cyclohexanediamine tetraacetic acid (DCTA), all of which show high stability over wide ranges of pH and high separation factors.

In another embodiment, the separation process may involve the use of simulating moving bed chromatography (SMB) instead of traditional chromatography columns 204 and 208. In this manner, the separation process may be continuously and performed, as an effective alternative to repetitions of single batch processes. Thus, in one embodiment, an ion exchange apparatus may be a moving bed ion exchange apparatus. In another embodiment, the ion exchange apparatus may comprise one or more static ion exchange columns.

RESULTS

Table 1 below illustrates the amounts in g/L of scandium and various impurities in the process feeds of an embodiment method described above with respect to FIG. 1. Measurements were taken for the initial waste acid feed 101 of a titanium processing plant refining $TiO_2$ using a sulfate process, and in the raffinate 103d following three cross-current solvent extraction stages 102a-102c to determine the percentages of scandium and impurities that were extracted into the organic phase 107.

TABLE 1

Typical Feed Materials Extraction

|  | g/L | | | | |
|---|---|---|---|---|---|
|  | Sc | Ti | Zr | Fe | $H_2SO_4$ |
| Feed: | | | | | |
| Typical waste acid | 0.015 | 3.0 | 0.033 | 19.0 | 300 |
| After extraction: | | | | | |
| Raffinate | 0.001 | 2.6 | 0.027 | 18.0 | 300 |
| Extraction (%) | 97 | 17 | 30 | 5 | N/A |

The data in Table 1 show that 97 wt % of the scandium initially present in the $TiO_2$ waste acid stream 101 was extracted in the cumulative loaded organic phase 107 through the three stages 102a-102c of cross-current solvent extraction. Thus, at least 90 wt %, such as 95-97 wt %, is removed in steps 102a-102c.

Table 2 below provides data for the amount of scandium and various impurities that were measured before (in the loaded organic 107) and after (in the scrub organic 107S) a zirconium scrubbing step 108 in which oxalic acid ($H_2C_2O_4$) 109 was used the scrubbing agent.

TABLE 2

Scrubbing Zr

|  | g/L | | | |
|---|---|---|---|---|
|  | Sc | Ti | Zr | Fe |
| Typical Feed Used to Generate Loaded Organic | | | | |
| Loaded organic | 0.4 | 7.0 | 0.03 | 0.2 |
| Scrub liquor | <0.0001 | 0.5 | 0.6 | 0.8 |
| Scrub organic | 0.4 | 6.5 | 0.004 | <0.02 |
| Extraction (%) | 0 | 7 | 96 | 90 |

The data show that the use of oxalic acid 1009 was effective for scrubbing Fe from the organic phase 107, as well as for Zr scrubbing. Thus, at least 90 wt %, such as 90-96 wt %, of Zr and Fe may be removed in step 108.

Table 3 below provides data for the amount of scandium and various impurities measured before (in the loaded organic 107) and after (in the scrub organic 107S) titanium scrubbing in step 110 with sulfuric acid (e.g., 5M $H_2SO_4$) and hydrogen peroxide (e.g., 5% $H_2O_2$) 113 as scrubbing agents:

TABLE 3

Scrubbing Ti

|  | g/L | | | |
|---|---|---|---|---|
|  | Sc | Ti | Zr | Fe |
| Typical Feed Used to Generate Loaded Organic | | | | |
| Loaded organic | 0.4 | 6.5 | <0.002 | <0.02 |
| Scrub liquor | <0.0001 | 18 | <0.0002 | <0.001 |
| Scrub organic | 0.4 | 0.02 | 0.002 | <0.02 |
| Extraction (%) | 0 | ~100 | ~100 | N/A |

Thus, following the two scrubbing steps, concentrations of each impurity (e.g., Ti, Fe, Zr, etc.) measured in the organic phase were at or below 2 wt % (e.g., 0.2-2 wt %). At least 95 wt % Ti, such as 99-99.9 wt % Ti, may be removed in step 110.

Table 4 below provides the amount of scandium oxide and other compounds that were measured before and after the cross-current solvent extraction and in the subsequent process streams for the production of each stage of cross-current solvent extraction and the subsequent process streams for production of $Sc_2O_3$.

TABLE 4

| Stream | Quantity | $Sc_2O_3$ | | $TiO_2$ | | $ZrO_2$ | |
|---|---|---|---|---|---|---|---|
| Dry basis | L/h | kg/h | % | kg/h | % | kg/h | % |
| Waste acid feed | 125,000 | 2.9 | 100 | 563 | 100 | 5.7 | 100 |
| Raffinate | 125,000 | 0.1 | 2 | 527 | 94 | 4.2 | 74 |
| Loaded organic | 3,125 | 2.8 | 98 | 36.5 | 6 | 1.5 | 26 |
| Stage recoveries from loaded organic | | | | | | | |
| Loaded organic | 3,125 | 2.8 | 100 | 36.5 | 100 | 1.5 | 100 |
| Zr scrub liquor | 1,563 | 0.0 | 0 | 5.2 | 14 | 1.5 | 100 |
| Ti scrub liquor | 1,042 | 0.0 | 0 | 31.2 | 86 | 0.0 | 0 |
| Sc strip liquor | 3,125 | 2.8 | 0 | 0.1 | 0 | 0.0 | 0 |
| $Sc(OH)_3$ cake | 5 kg/h | 2.8 | 99 | 0.1 | 0 | 0.0 | 0 |

Thus, 5 kg/h of 99.9 wt % $Sc(OH)_3$ cake 125 is produced from a Ti-containing waste acid stream 101 having a flow rate of 125,000 L/h. In other words, at least 4.5 kg/h (e.g., 4.5 to 5 kg/hr) of at least 99 wt % (such as 99-99.9 wt %) $Sc(OH)_3$ cake 125 is produced per 125,000 L/h of a Ti-containing waste acid stream 101. The calcined and dried scandium oxide product forms at least 2 kg/h (e.g., 2 to 2.9 kg/h), such as at least 2.8 kg/h of the scandium oxide solid product per 125,000 L/h of the waste acid stream 101.

Figure 4:
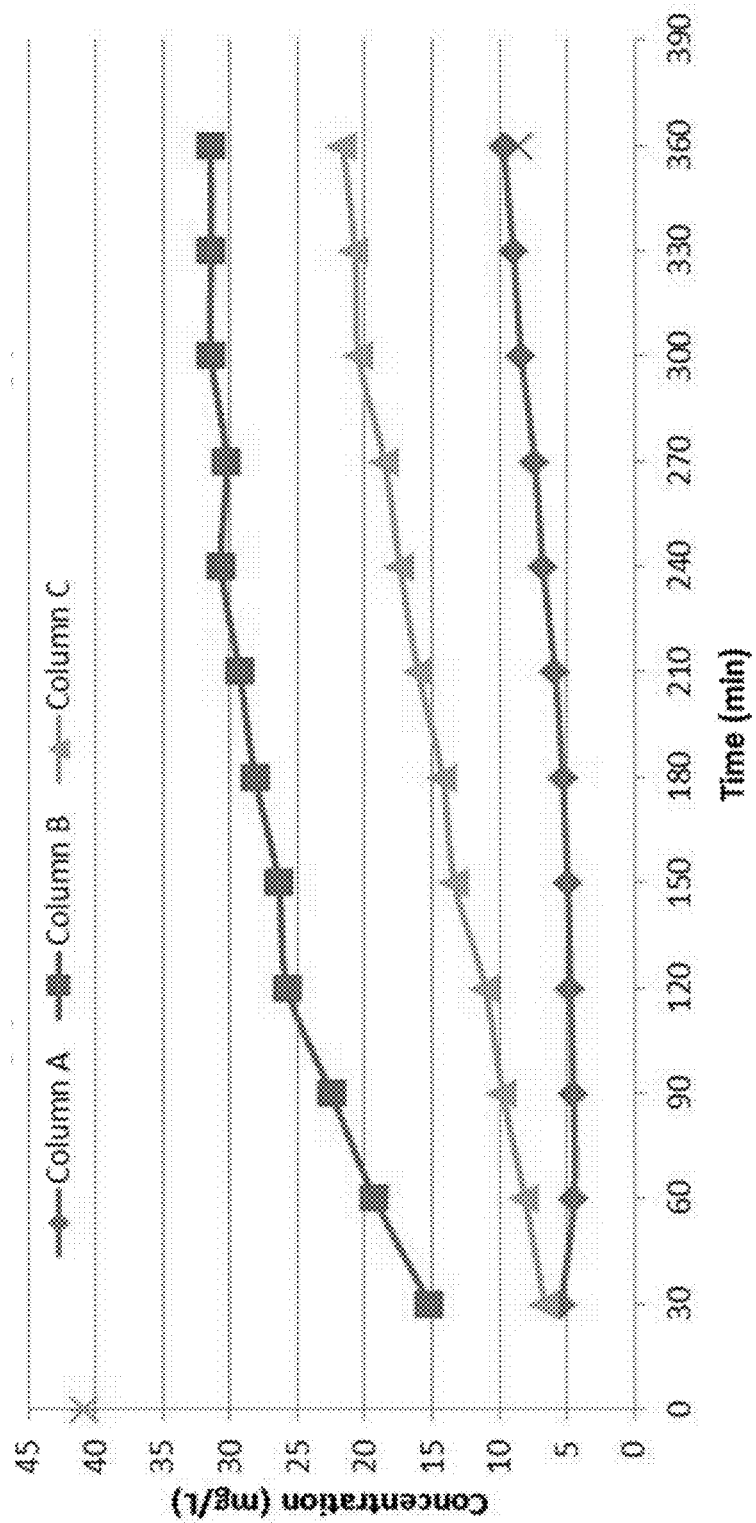
FIG. 4 is a graph showing scandium loading profiles of three example ion exchange columns in series in the form of concentration as a function of time.

FIG. 4 illustrates a loading profile for scandium in ion exchange columns of an embodiment method described above with respect to FIG. 3. A waste acid feed 304 from a titanium processing plant was provided to three ion exchange columns 305 arranged in series, each containing a Monophos™ cationic exchange resin. Measurements of the concentrations of scandium loaded in the three columns are shown as a function of time. As shown in FIG. 4, the second column (Column B) may be loaded with at least 30 mg/L (e.g., 30-31 mg/L) of scandium after 200 minutes.

Figure 5:
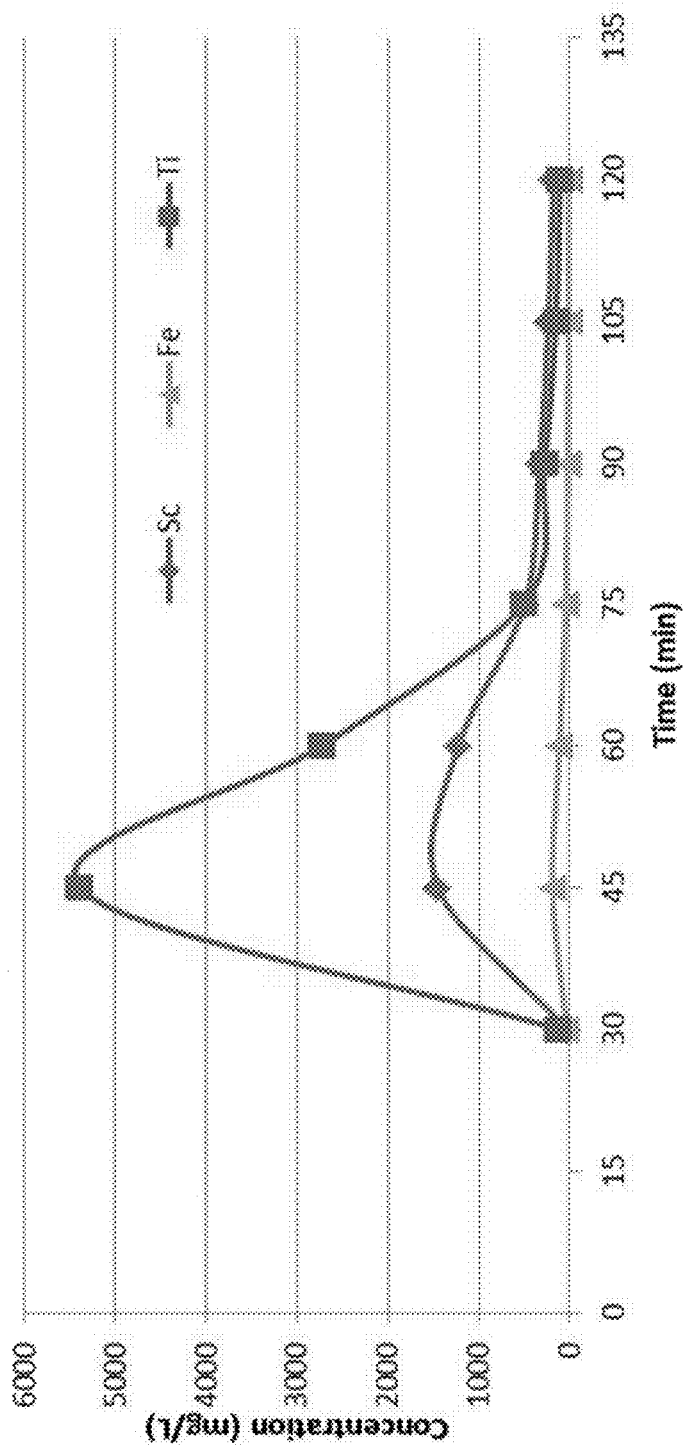
FIG. 5 is a graph showing scandium, titanium and iron (III) ion elution profiles in the form of concentration as a function of time for the example ion exchange columns used in FIG. 4.

FIG. 5 illustrates elution profiles of titanium, scandium and iron (III) ions in an eluate 312, from elution of loaded ion exchange columns 306, having the loading profile shown in FIG. 4, with a sodium carbonate eluent 310. Measurements of the concentrations of titanium, scandium and iron (III) ions eluted into solution are each shown as a function of time.

As is understood in the art, not all equipment or apparatuses are shown in the figures. For example, one of skill in the art would recognize that various holding tanks and/or pumps may be employed in the present method.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the steps as a sequential process, many of the steps can be performed in parallel or concurrently.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method of selectively removing scandium from a scandium-containing feed solution, comprising:
   contacting the scandium-containing feed solution with a solvent stream in plural stages using cross current extraction, wherein the solvent is loaded with at least a portion of the scandium from the scandium-containing feed solution; and
   separating the loaded solvent from remaining scandium-containing feed solution; wherein:
   the step of contacting comprises:
      contacting the scandium-containing feed solution with a barren first solvent stream in a first stage, wherein the first solvent stream is loaded with at least a portion of the scandium from the scandium-containing feed solution; and
      contacting the remaining scandium-containing feed solution from the first stage with a barren second solvent stream in a second stage, wherein the second solvent stream is loaded with at least a portion of the scandium from the remaining scandium-containing feed solution from the first stage; and
   the step of separating comprises:
      separating the loaded first solvent from the remaining scandium-containing feed solution from the first stage; and
      separating the loaded second solvent from remaining scandium-containing feed solution from the second stage.

2. The method of claim 1, wherein:
   the step of contacting further comprises contacting the remaining scandium-containing feed solution from the second stage with a barren third solvent stream in a third stage, wherein the third solvent stream is loaded with at least a portion of the scandium from the remaining scandium-containing feed solution from the second stage; and
   the step of separating further comprises separating the loaded third solvent from the remaining scandium-containing feed solution from the third stage.

3. The method of claim 2, wherein the first, second and third stages are performed respectively in first, second, and third extraction units, and the first, second and third extraction units are connected in series to form a cross-current array.

4. The method of claim 2, further comprising collecting the separated loaded first, second and third solvent streams in a single loaded solvent stream.

5. The method of claim 2, wherein the plural stages comprise more than three stages.

6. A method of selectively removing scandium from a scandium-containing feed solution, comprising:
   contacting the scandium-containing feed solution with a solvent stream in plural stages using cross current extraction, wherein the solvent is loaded with at least a portion of the scandium from the scandium-containing feed solution; and
   separating the loaded solvent from remaining scandium-containing feed solution;
   wherein the scandium-containing feed solution is an aqueous solution, and wherein the solvent stream is an organic liquid phase; and further comprising:
   unloading scandium ions from the organic phase using a strip solution, wherein $Sc^{3+}$ ions react with anions in the strip solution to form a scandium precipitate; and
   wherein the strip solution comprises sodium hydroxide (NaOH), and wherein the scandium precipitate comprises scandium(III) hydroxide ($Sc(OH)_3$).

7. The method of claim 6, further comprising:
   filtering the scandium precipitate to make a filter cake containing scandium hydroxide.

8. The method of claim 6, further comprising collecting spent strip solution, wherein sodium hydroxide (NaOH) in the spent strip solution is recycled for use in the strip solution for unloading scandium ions from the organic phase.

9. The method of claim 7, further comprising leaching $Sc^{3+}$ ions from the filter cake, wherein the scandium ions are incorporated into an aqueous filtrate.

10. The method of claim 9, further comprising providing an effluent aqueous solution to at least one column, wherein the scandium ions are loaded in a stationary phase.

11. The method of claim 9, further comprising:
   contacting the aqueous filtrate with a second organic phase containing an extractant, wherein the second organic phase is loaded with at least a portion of the $Sc^{3+}$ ions from the aqueous filtrate; and
   unloading the $Sc^{3+}$ ions from the second organic phase by contacting the second organic phase with a water stream, wherein at least the portion of the $Sc^{3+}$ ions are dissolved in the water stream to form a second aqueous solution; and
   contacting the second aqueous solution with oxalic acid, wherein at least the portion of the $Sc^{3+}$ ions react with oxalate ions to form a scandium oxalate precipitate.

12. The method of claim 10, wherein the stationary phase comprises at least one ion exchange resin.

13. The method of claim 12, further comprising:
   eluting scandium ions from the stationary phase using an acid solution to form an eluate.

14. The method of claim 11, further comprising filtering the scandium oxalate precipitate to obtain a scandium oxalate product.

15. The method of claim 14, further comprising calcinating the scandium oxalate product to a scandium oxide product.

16. The method of claim 15, wherein the scandium oxide product contains about 99.9% scandium(III) oxide ($Sc_2O_3$).

17. The method of claim 13, wherein the acid solution comprises hydrochloric acid (HCl), and wherein the eluate comprises scandium chloride.

18. The method of claim 17, further comprising:
   mixing the scandium chloride with a solution containing oxalic acid, wherein scandium oxalate precipitates out of the solution.

19. The method of claim 18, further comprising filtering the precipitated scandium oxalate to form a scandium oxalate product.

20. The method of claim 19, further comprising calcinating the scandium oxalate product to a scandium oxide product.

21. The method of claim 20, wherein the scandium oxide product is about 95% scandium(III) oxide ($Sc_2O_3$).

22. A method of selectively removing scandium from a scandium-containing feed solution, comprising:
- contacting the scandium-containing feed solution with at least one ion exchange resin, such that the at least one ion exchange resin is loaded with at least a portion of the scandium from the scandium-containing feed solution;
- providing an eluent solution to the at least one ion exchange resin, wherein scandium is unloaded into an eluate stream; and
- converting the unloaded scandium in the eluate stream to a solid scandium oxide product;
- wherein the eluent solution provided to the at least one ion exchange resin comprises a solution having a $pK_a$ that is greater than or equal to −2; and
- wherein the eluent solution provided to the at least one ion exchange resin comprises ethylene diaminetetraacetic acid (EDTA).

23. A method of selectively removing scandium from a scandium-containing feed solution, comprising:
- contacting the scandium-containing feed solution with at least one ion exchange resin, such that the at least one ion exchange resin is loaded with at least a portion of the scandium from the scandium-containing feed solution;
- providing an eluent solution to the at least one ion exchange resin, wherein scandium is unloaded into an eluate stream; and
- converting the unloaded scandium in the eluate stream to a solid scandium oxide product;
- wherein the eluent solution provided to the at least one ion exchange resin comprises a solution having a $pK_a$ that is greater than or equal to −2; and
- wherein the eluent solution provided to the at least one ion exchange resin comprises sodium carbonate ($Na_2CO_3$).

24. A method of selectively removing scandium from a scandium-containing feed solution, comprising:
- contacting the scandium-containing feed solution with at least one ion exchange resin, such that the at least one ion exchange resin is loaded with at least a portion of the scandium from the scandium-containing feed solution;
- providing an eluent solution to the at least one ion exchange resin, wherein scandium is unloaded into an eluate stream; and
- converting the unloaded scandium in the eluate stream to a solid scandium oxide product;
- wherein the eluent solution provided to the at least one ion exchange resin comprises a solution having a $pK_a$ that is greater than or equal to −2; and
- wherein the eluent solution provided to the at least one ion exchange resin comprises 1-hydroxyethylidene 1,1-diphosphonic acid.

25. A method of selectively removing scandium from a scandium-containing feed solution, comprising:
- contacting the scandium-containing feed solution with at least one ion exchange resin, such that the at least one ion exchange resin is loaded with at least a portion of the scandium from the scandium-containing feed solution;
- providing an eluent solution to the at least one ion exchange resin, wherein scandium is unloaded into an eluate stream; and
- converting the unloaded scandium in the eluate stream to a solid scandium oxide product; wherein the concentration of scandium in the scandium-containing feed solution is less than or equal to 40 mg/mL, and wherein the concentration of scandium in the eluate stream is greater than 800 mg/mL.

* * * * *